United States Patent
Yokono et al.

(10) Patent No.: US 10,138,831 B2
(45) Date of Patent: Nov. 27, 2018

(54) CONTROLLER AND CONTROL METHOD FOR INTERNAL COMBUSTION ENGINE

(71) Applicant: Mitsubishi Electric Corporation, Tokyo (JP)

(72) Inventors: Michihisa Yokono, Hyogo (JP); Hideki Hagari, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/657,363

(22) Filed: Jul. 24, 2017

(65) Prior Publication Data
US 2018/0258869 A1   Sep. 13, 2018

(30) Foreign Application Priority Data

Mar. 8, 2017 (JP) ................................. 2017-043415

(51) Int. Cl.
*B60T 7/12* (2006.01)
*F02D 41/00* (2006.01)
*F02M 26/46* (2016.01)

(52) U.S. Cl.
CPC ..... *F02D 41/0052* (2013.01); *F02D 41/0072* (2013.01); *F02D 41/0077* (2013.01); *F02M 26/46* (2016.02)

(58) Field of Classification Search
CPC ..... F02D 2009/0279; F02D 2009/0281; F02D 2009/0284; F02D 2021/083; F02D 2021/086; F02D 2041/007; F02D 2041/0075; F02D 35/0015; F02D 41/0052; F02D 41/0062; F02M 26/49

USPC ........ 701/103, 108; 123/402, 403, 462, 463, 123/478, 480, 568.11, 568.19, 568.21, 123/568.23, 568.26
See application file for complete search history.

(56) References Cited

U.S. PATENT DOCUMENTS

| | | | |
|---|---|---|---|
| 5,505,174 A | 4/1996 | Komoriya et al. | |
| 2016/0245200 A1* | 8/2016 | Bohr | F02D 41/0037 |
| 2017/0002761 A1* | 1/2017 | Dudar | F02D 41/22 |
| 2017/0066322 A1* | 3/2017 | Dudar | B60W 20/00 |
| 2018/0058386 A1* | 3/2018 | Dudar | F02D 41/0045 |

FOREIGN PATENT DOCUMENTS

JP          7-279774 A       10/1995

* cited by examiner

*Primary Examiner* — John Kwon
(74) *Attorney, Agent, or Firm* — Sughrue Mion, PLLC; Richard C. Turner

(57) ABSTRACT

To provide a controller and a control method for an internal combustion engine capable of learning the individual difference and the aging change of the flow characteristic of the EGR valve, by a method which is hardly influenced by the individual difference and the aging change of the internal combustion engine body, and improving the estimation accuracy of the flow rate of recirculation exhaust gas. The controller for an internal combustion engine calculates an oxygen concentration detecting EGR rate Regr based on the inner-manifold oxygen concentration; calculates an oxygen concentration detecting recirculation flow rate based on the oxygen concentration detecting EGR rate and the intake air flow rate, and calculates a learning value of the opening area of EGR valve; and calculates a flow rate of recirculation exhaust gas for control based on the learned opening area.

11 Claims, 6 Drawing Sheets

CONTROLLER AND CONTROL METHOD FOR INTERNAL COMBUSTION ENGINE

INCORPORATION BY REFERENCE

The disclosure of Japanese Patent Application No. 2017-43415 filed on Mar. 8, 2017 including its specification, claims and drawings, is incorporated herein by reference in its entirety.

BACKGROUND

The present invention relates to a controller and control method for an internal combustion engine that is provided with an intake path and an exhaust path, a throttle valve for opening and closing the intake path, an EGR path for recirculating exhaust gas from the exhaust path to an intake manifold which is a part of the intake path at the downstream side of the throttle valve, and an EGR valve for opening and closing the EGR path.

In order to appropriately control an internal combustion engine, it is important to accurately calculate the amount of air taken into a cylinder and to accurately control the fuel supply amount and the ignition timing in accordance with the cylinder intake air amount. Ignition timing control needs to change an ignition timing to the ignition timing (MBT: Minimum Spark Advance for Best Torque) at which the output torque becomes maximal or the like, in accordance with not only the rotation speed of the internal combustion engine and the cylinder intake air amount but also other factors such as the coolant temperature of the internal combustion engine, whether or not a knock has occurred, the fuel property, and the EGR (Exhaust Gas Recirculation) rate.

Meanwhile, with regard to the EGR, there are two methods, i.e., a method (referred to as an external EGR, hereinafter) in which an EGR valve is provided in an EGR path for recirculating exhaust gas from the exhaust path to the intake manifold and the amount of exhaust gas to be recirculated to the intake manifold is controlled based on the opening degree of the EGR valve and a method (referred to as an internal EGR, hereinafter) in which a variable valve timing mechanism, which makes the opening/closing timings of one of or both of an intake valve and an exhaust valve variable, is provided and an overlap period, during which the intake valve and the exhaust valve are concurrently opened, is changed so that the amount of exhaust gas remaining in the cylinder is controlled. In recent years, in order to reduce the fuel cost and raise the output, the number of internal combustion engines provided with both the external EGR mechanism and the internal EGR mechanism has been increasing. In the present invention, an EGR and an EGR rate, when simply described in this manner, denote an external EGR and an external EGR rate, respectively.

In recent years, an internal combustion engine has been controlled by utilizing, as an index, the output torque of the internal combustion engine. Because the thermal efficiency changes depending on the cylinder intake air amount and the EGR rate, it is required to estimate the output torque based on the cylinder intake air amount and the EGR rate. Accordingly, either in order to control the ignition timing or in order to estimate the output torque, it is required to accurately estimate the EGR rate.

As a technology for estimating an EGR rate, for example, the technology disclosed in Japanese Patent Application Publication No. H07-279774 (JP H07-279774 A) has already been known. In the technology of the JP H07-279774 A, the flow rate QACT of the recirculation exhaust gas according to the opening area of the EGR valve is estimated using the flow characteristic of the EGR valve, and the flow rate QCMD of the recirculation exhaust gas according to the command value of the opening area of the EGR valve is estimated using the flow characteristic of the EGR valve. Based on the flow rates QACT and QCMD of recirculation exhaust gas, it configures so that an EGR rate may be estimated.

SUMMARY

However, in the technology of the JP H07-279774 A, by the individual difference of the flow characteristic of the EGR valve, and the aging change of the flow characteristic of the EGR valve by deposits, such as soot, there has been a problem that the estimation accuracy of the flow rate of recirculation exhaust gas was deteriorated, and the estimation accuracy of the EGR rate was deteriorated.

In order to improve the estimation accuracy, it is conceivable to learn the variation of the flow characteristic of the EGR valve. In this case, in order to improve the learning accuracy, it is desirable to use a method which is hardly influenced by the individual difference and the aging change of the internal combustion engine body.

Thus, it is desirable to provide a controller and a control method for an internal combustion engine capable of learning the individual difference and the aging change of the flow characteristic of the EGR valve, by a method which is hardly influenced by the individual difference and the aging change of the internal combustion engine body, and improving the estimation accuracy of the flow rate of recirculation exhaust gas.

A controller for an internal combustion engine according to the present invention is a controller for an internal combustion engine that is provided with an intake path and an exhaust path, a throttle valve for opening and closing the intake path, an EGR path for recirculating exhaust gas from the exhaust path to an intake manifold which is a part of the intake path at the downstream side of the throttle valve, and an EGR valve for opening and closing the EGR path, the controller for the internal combustion engine including:

a driving condition detector that detects an inner-manifold oxygen concentration which is an oxygen concentration of gas in the intake manifold, an intake air flow rate which is a flow rate of intake air taken into in the intake path, and an opening degree of the EGR valve;

an oxygen concentration detecting EGR rate calculator that calculates an oxygen concentration detecting EGR rate, which is a ratio of a recirculation exhaust gas which is the exhaust gas recirculated into the intake manifold, to the intake air, based on the inner-manifold oxygen concentration;

an opening area learning value calculator that calculates an oxygen concentration detecting recirculation flow rate which is a flow rate of the recirculation exhaust gas based on the oxygen concentration detecting EGR rate and the intake air flow rate, calculates an oxygen concentration detecting opening area which is an opening area of the EGR valve which realizes the oxygen concentration detecting recirculation flow rate, and calculates a learning value of the opening area of the EGR valve based on the oxygen concentration detecting opening area; and a recirculation exhaust gas calculator for control that
calculates a learned opening area of the EGR valve corresponding to the present opening degree of the EGR valve using the learning value of the opening area, and calculates a flow rate of the recirculation exhaust gas for control used for controlling the internal combustion engine based on the learned opening area.

A control method of an internal combustion engine according to the present invention is a control method for an internal combustion engine that is provided with an intake path and an exhaust path, a throttle valve for opening and closing the intake path, an EGR path for recirculating exhaust gas from the exhaust path to an intake manifold which is a part of the intake path at the downstream side of the throttle valve, and an EGR valve for opening and closing the EGR path, the control method including:

a driving condition detecting that detects an inner-manifold oxygen concentration which is an oxygen concentration of gas in the intake manifold, an intake air flow rate which is a flow rate of intake air taken into in the intake path, and an opening degree of the EGR valve;

an oxygen concentration detecting EGR rate calculating that calculates an oxygen concentration detecting EGR rate, which is a ratio of a recirculation exhaust gas which is the exhaust gas recirculated into the intake manifold, to the intake air, based on the inner-manifold oxygen concentration;

an opening area learning value calculating that calculates an oxygen concentration detecting recirculation flow rate which is a flow rate of the recirculation exhaust gas based on the oxygen concentration detecting EGR rate and the intake air flow rate, calculates an oxygen concentration detecting opening area which is an opening area of the EGR valve which realizes the oxygen concentration detecting recirculation flow rate, and calculates a learning value of the opening area of the EGR valve based on the oxygen concentration detecting opening area; and a recirculation exhaust gas calculating for control that calculates a learned opening area of the EGR valve corresponding to the present opening degree of the EGR valve using the learning value of the opening area, and calculates a flow rate of the recirculation exhaust gas for control used for controlling the internal combustion engine based on the learned opening area.

According to the controller and the control method for the internal combustion engine concerning the present invention, since the EGR rate (the oxygen concentration detecting EGR rate) is calculated based on the detection value of inner-manifold oxygen concentration which is hardly influenced by the individual difference and the aging change of the internal combustion engine body, the detection accuracy of the EGR rate can be improved. On the other hand, since the inner-manifold oxygen concentration is the oxygen concentration of gas after mixing and averaging the intake air and the recirculation exhaust gas in the intake manifold, the oxygen concentration detecting EGR rate is an information which was delayed in response rather than the flow rate of recirculation exhaust gas which passes the EGR valve. Therefore, it is not easy to calculate the accurate flow rate of recirculation exhaust gas having no response delay directly from the oxygen concentration detecting EGR rate. Accordingly, by calculating the learning value of the opening area of the EGR valve in which a responsiveness is not required, based on the oxygen concentration detecting EGR rate and the like, and calculating the flow rate of the recirculation exhaust gas for control, based on the learned opening area, the flow rate of the recirculation exhaust gas after learning having no response delay can be calculated. Therefore, the individual difference and the aging change of the flow characteristic of the EGR valve can be learned by the method which is hardly influenced by the individual difference and the aging change of the internal combustion engine, and the estimation accuracy of the flow rate of recirculation exhaust gas for control can be improved.

DETAILED DESCRIPTION OF THE EMBODIMENTS

1. Embodiment 1

Figure 1:
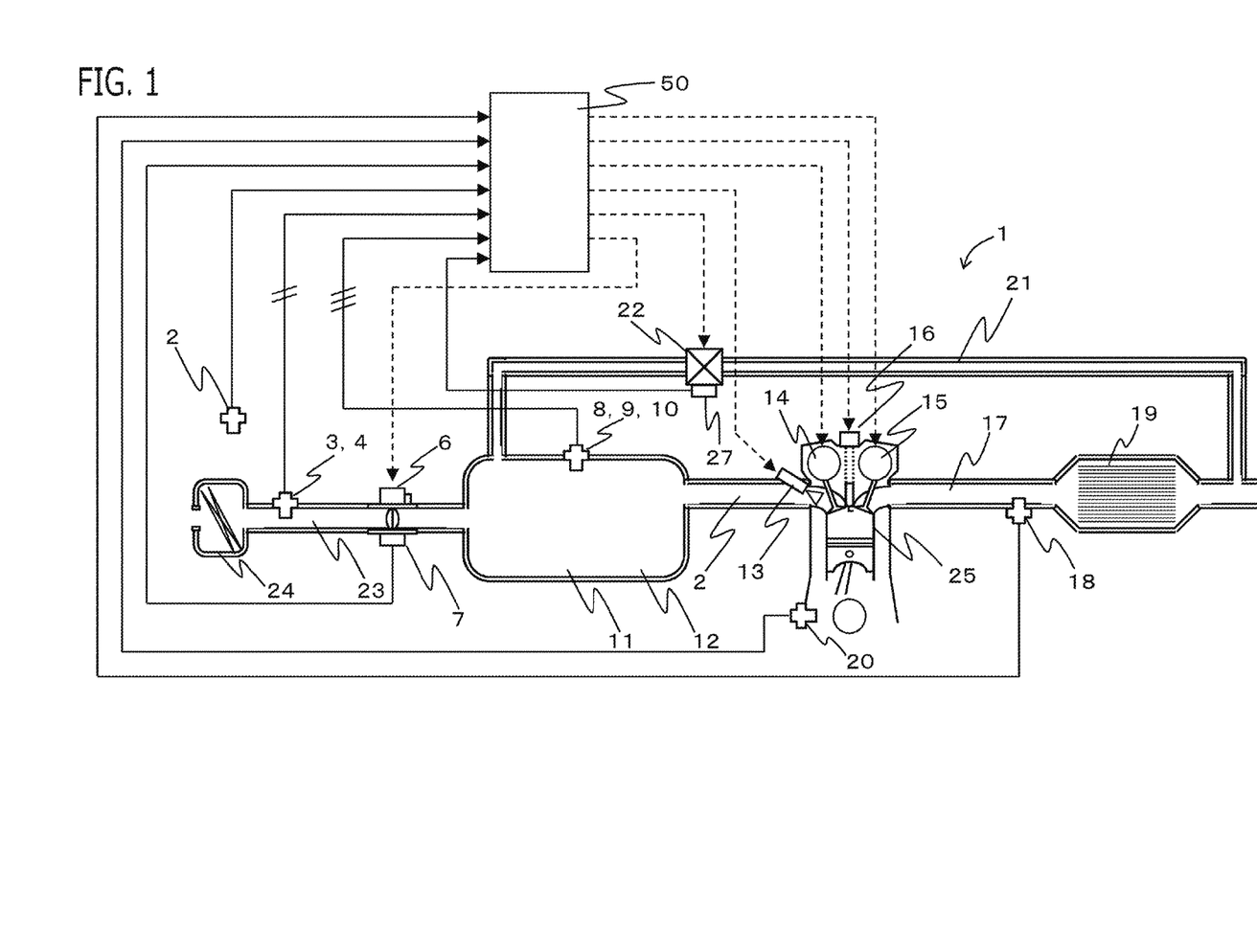
FIG. 1 is a schematic configuration diagram of an internal combustion engine and a controller according to Embodiment 1 of the present invention.
Figure 2:
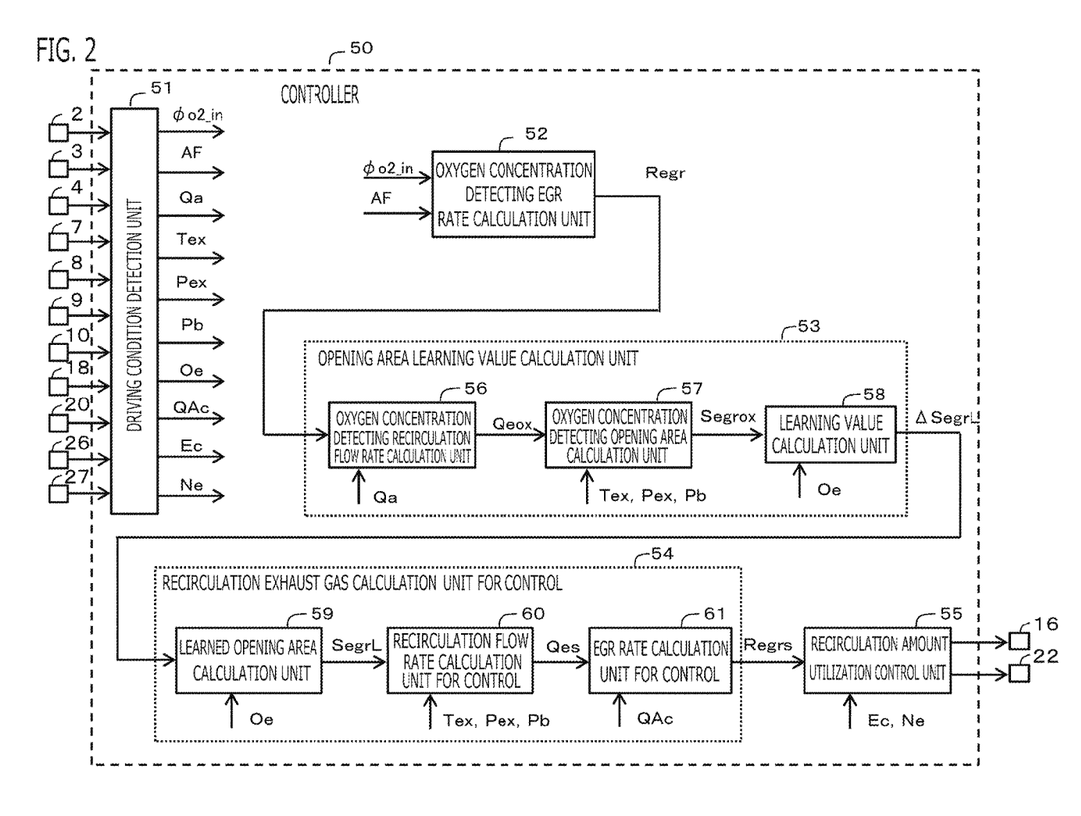
FIG. 2 is a block diagram of the controller according to Embodiment 1 of the present invention.

A controller 50 for an internal combustion engine 1 (hereinafter, referred to simply as the controller 50) according to Embodiment 1 will be explained with reference to the drawings. FIG. 1 is a schematic configuration diagram of the internal combustion engine 1 and the controller 50; FIG. 2 is a block diagram of the controller 50 according to Embodiment 1. The internal combustion engine 1 and the controller 50 are mounted in a vehicle; the internal combustion engine 1 functions as a driving-force source for the vehicle (wheels).

1-1. The Configuration of the Internal Combustion Engine 1

The configuration of the internal combustion engine 1 will be explained. The internal combustion engine 1 has a cylinder 25 in which a fuel-air mixture is combusted. The internal combustion engine 1 has an intake path 23 for supplying air to the cylinder 25 and an exhaust path 17 for discharging exhaust gas combusted in the cylinder 25. The internal combustion engine 1 has a throttle valve 6 for opening and closing the intake path 23. The throttle valve 6 is an electronically controlled throttle valve that is opening/closing-driven by an electric motor controlled by the controller 50. The throttle valve 6 is provided with a throttle opening degree sensor 7 that generates an electric signal according to a throttle opening degree of the throttle valve 6.

An air cleaner 24 for purifying air taken into the intake path 23 is provided at the most upstream portion of the intake path 23. In the intake path 23 at the upstream side of the throttle valve 6, there are provided an air flow sensor 3 that outputs an electric signal according to the flow rate of intake air, which is air to be taken from the atmosphere into the intake path 23, and an intake air temperature sensor 4 that outputs an electric signal according to an intake air temperature Ta, which is the temperature of intake air. The pressure in the intake path 23 at the upstream side of the throttle valve 6 can be regarded as equal to the atmospheric pressure. An intake air pressure sensor 2 that outputs an electric signal according to an intake air pressure Pa, which is the pressure of intake air (the atmospheric air, in this example), is provided outside the intake path 23 (for example, inside the controller 50).

The intake air temperature sensor 4 may be either integrated with or separated from the air flow sensor 3. Alternatively, the intake air temperature sensor 4 may be provided outside the intake path 23, as is the case with the intake air pressure sensor 2; the intake air pressure sensor 2 may be provided at a place the same as the place where the intake air temperature sensor 4 is provided. In any case, the intake air pressure sensor 2 and the intake air temperature sensor 4 are provided at a place where there exists intake air to be taken into the intake path 23 and the pressure of the intake air is substantially the same.

The portion, at the downstream side of the throttle valve 6, of the intake path 23 is an intake manifold 12. The upstream portion of the intake manifold 12 is a surge tank 11 for suppressing an intake air ripple. The internal combustion engine 1 has an EGR path 21 for recirculating exhaust gas from the exhaust path 17 to the intake manifold 12 (the surge tank 11, in this example) and an EGR valve 22 for opening and closing the EGR path 21. In the present embodiment, the EGR flow path 21 is connected to a part of the exhaust path 17 at the downstream side of the catalyst 19. The EGR flow path 21 may be connected to a part of the exhaust path 17 at the upstream side of the catalyst 19. The EGR valve 22 is an electronically controlled EGR valve that is opening/closing-driven by an electric actuator such as an electric motor to be controlled by the controller 50. The EGR valve 22 is provided with an EGR opening degree sensor 27 that outputs an electric signal according to the opening degree Oe of the EGR valve 22. Exhaust gas (referred to as recirculation exhaust gas, hereinafter) that is recirculated to the surge tank 11 and intake air that is taken into the surge tank 11 are mixed and homogenized in the surge tank 11. "EGR" is an acronym for Exhaust Gas Recirculation.

In the intake manifold 12, there are provided a manifold pressure sensor 8 that outputs an electric signal according to a manifold pressure Pb, which is the pressure of gas in the intake manifold 12, a manifold temperature sensor 9 that outputs an electric signal according to a manifold temperature Tb, which is the temperature of gas in the intake manifold 12, and a manifold oxygen concentration sensor 10 that outputs an electric signal according to an inner-manifold oxygen concentration φo2_in, which is the oxygen concentration of gas in the intake manifold 12. The oxygen concentration detected by the manifold oxygen concentration sensor 10 is a volume concentration.

Each of the manifold temperature sensor 9 and the manifold oxygen concentration sensor 10 may be either integrated with or separated from the manifold pressure sensor 8. The manifold temperature sensor 9 and the manifold oxygen concentration sensor 10 are provided at the downstream side of the connection point between the intake manifold 12 and the EGR path 21 so that the temperature and the oxygen concentration of a gas obtained by sufficiently mixing intake air with recirculation exhaust gas can be detected.

An injector 13 for injecting a fuel is provided at the downstream side part of the intake manifold 12. The injector 13 may be provided so as to inject a fuel directly into the cylinder 25.

An ignition plug for igniting a fuel-air mixture and an ignition coil 16 for supplying ignition energy to the ignition plug are provided on the top of the cylinder 25. On the top of the cylinder 25, there are provided an intake valve 14 for adjusting the amount of intake air to be taken from the intake path 23 into the cylinder 25 and an exhaust valve 15 for adjusting the amount of exhaust gas to be exhausted from the cylinder to the exhaust path 17. The intake valve 14 is provided with an intake variable valve timing mechanism that makes the opening and closing timing thereof variable. The exhaust valve 15 is provided with an exhaust-gas variable valve timing mechanism that makes the opening/closing timing therefor variable. Each of the variable valve timing mechanisms 14 and 15 has an electric actuator. On the crankshaft of the internal combustion engine 1, there is provided a crank angle sensor 20 for generating an electric signal according to the rotation angle thereof.

In the exhaust path 17, there is provided an air-fuel ratio sensor 18 that generates an electric signal according to an air-fuel ratio AF, which is the ratio of air to fuel in exhaust gas. A catalyst 19 for purifying exhaust gas is also provided in the exhaust path 17. As the catalyst 19, a three-way catalyst, the purification performance of which becomes higher in the vicinity of the theoretical air-fuel ratio AF0, is utilized.

1-2. The Configuration of the Controller 50

Figure 3:
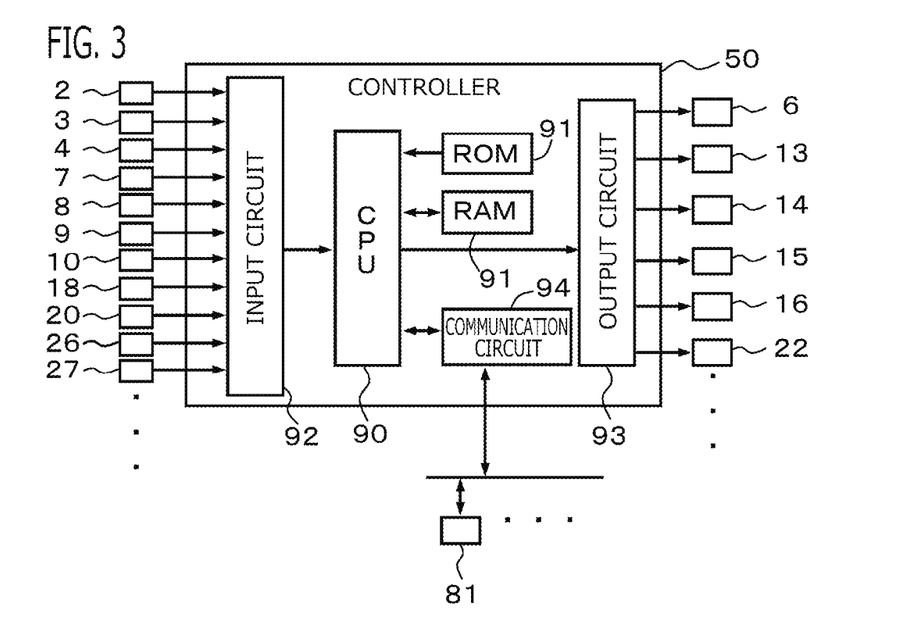
FIG. 3 is a hardware configuration diagram of the controller according to Embodiment 1 of the present invention.

Next, the controller 50 will be explained. The controller 50 is the one whose control subject is the internal combustion engine 1. As represented in FIG. 2, the controller 50 is provided with control units such as a driving condition detection unit 51, an oxygen concentration detecting EGR rate calculation unit 52, an opening area learning value calculation unit 53, a recirculation exhaust gas calculation unit 54 for control, and a recirculation amount utilization control unit 55. The respective control units 51 through 55 and the like of the controller 50 are realized by processing circuits included in the controller 50. Specifically, as illustrated in FIG. 3, the controller 50 includes, as processing circuits, a computing processing unit (computer) 90 such as a CPU (Central Processing Unit), storage apparatuses 91 which exchange data with the computing processing unit 90, an input circuit 92 which inputs external signals to the computing processing unit 90, an output circuit 93 which outputs signals from the computing processing unit 90 to the outside, a communication circuit 94 in which the computing processing unit 90 performs data communication with external apparatuses, and the like.

As the computing processing unit 90, DSP (Digital Signal Processor), ASIC (Application Specific Integrated Circuit), FPGA (Field Programmable Gate Array), IC (Integrated Circuit), various kinds of logical circuits, various kinds of signal processing circuits, and the like may be provided. As the computing processing unit 90, a plurality of the same type ones or the different type ones may be provided, and each processing may be shared and executed. As the storage apparatuses 91, there are provided a RAM (Random Access Memory) which can read data and write data from the computing processing unit 90, a ROM (Read Only Memory) which can read data from the computing processing unit 90, and the like. The input circuit 92 is connected with various kinds of sensors and switches and is provided with an A/D converter and the like for inputting output signals from the sensors and the switches to the computing processing unit 90. The output circuit 93 is connected with electric loads and is provided with a driving circuit and the like for outputting a control signal from the computing processing unit 90. The communication circuit 94 is connected with other vehicle electronic apparatuses such as a transmission controller 81 and the like through a communication wire and performs cable communication based on a communication protocol such as the CAN (Controller Area Network).

Then, the computing processing unit 90 runs software items (programs) stored in the storage apparatus 91 such as a ROM and collaborates with other hardware devices in the controller 50, such as the storage apparatus 91, the input circuit 92, the output circuit 93, and the communication circuit 94, so that the respective functions of the control units 51 through 55 included in the controller 50 are realized. Setting data items such as characteristic data and determination values to be utilized in the control units 51 through 55 are stored, as part of software items (programs), in the storage apparatus 91 such as a ROM.

In the present embodiment, the input circuit 92 is connected with the intake air pressure sensor 2, the air flow sensor 3, the intake air temperature sensor 4, the throttle opening degree sensor 7, the manifold pressure sensor 8, the manifold temperature sensor 9, the manifold oxygen concentration sensor 10, the air-fuel ratio sensor 18, the crank angle sensor 20, an accelerator position sensor 26, the EGR opening degree sensor 27, and the like. The output circuit 93 is connected with the throttle valve 6 (electric motor), the injector 13, the intake variable valve timing mechanism 14, the exhaust variable valve timing mechanism 15, the ignition coil 16, the EGR valve 22 (the electric actuator), and the like. The controller 50 is connected with various kinds of unillustrated sensors, switches, actuators, and the like.

As basic control, the controller 50 calculates a fuel injection amount, an ignition timing, and the like, based on inputted output signals and the like from the various kinds of sensors, and then performs driving control of the injector 13, the ignition coil 16, and the like. Based on the output signal of the accelerator position sensor 26 and the like, the controller 50 calculates the output torque of the internal combustion engine 1, demanded by the driver, and then controls the throttle valve 6 and the like so that an intake air amount for realizing the demanded output torque is obtained. At this time, the output torque of the internal combustion engine 1 which is described below and which is calculated based on the recirculation exhaust gas flow rate Qes for control may be taken into consideration. Specifically, the controller 50 calculates a target throttle opening degree and then performs driving control of the electric motor for the throttle valve 6 so that the throttle opening degree, detected based on the output signal of the throttle opening degree sensor 7, approaches the target throttle opening degree.

<The Driving Condition Detection Unit 51>

The driving condition detection unit 51 detects the driving conditions of the internal combustion engine 1 and the vehicle. The driving condition detection unit 51 detects various kinds of driving conditions, based on, for example, the output signals of various kinds of sensors. The driving condition detection unit 51 detects the manifold pressure Pb, the manifold temperature Tb, and the inner-manifold oxygen concentration φo2_in. In the present embodiment, the driving condition detection unit 51 detects the manifold pressure Pb, based on the output signal of the manifold pressure sensor 8. The driving condition detection unit 51 detects the manifold temperature Tb, based on the output signal of the manifold temperature sensor 9. The driving condition detection unit 51 detects the inner-manifold oxygen concentration φo2_in based on the output signal of the manifold oxygen concentration sensor 10.

The driving condition detection unit 51 detects the intake air pressure Pa and the intake air temperature Ta. In the present embodiment, the driving condition detection unit 51 detects the intake air pressure Pa, based on the output signal of the intake air pressure sensor 2. The driving condition detection unit 51 detects the intake air temperature Ta, based on the output signal of the intake air temperature sensor 4.

The driving condition detection unit 51 detects a throttle opening angle based on the output signal of the throttle position sensor 7, and detects the opening degree Oe of the EGR valve 22 based on the output signal of the EGR opening degree sensor 27. The driving condition detection unit 51 detects an air-fuel ratio AF of the exhaust gas based on the output signal of the air-fuel ratio sensor 18, detects a rotational speed Ne of the internal combustion engine 1 based on the output signal of the crank angle sensor 20, and detects an accelerator opening degree based on the output signal of the accelerator position sensor 26.

Depending on the kind of electric motor which configures the EGR valve, if the opening degree of the EGR valve can be estimated from the output state of the energization control of the motor, the EGR opening degree sensor 27 may not be provided, and an estimated value of the opening degree may be set to the opening degree Oe of the EGR valve 22.

The driving condition detection unit 51 detects an intake air flow rate Qa, based on the output signal of the air flow sensors 3. The driving condition detection unit 51 calculates an intake air amount QA [g/stroke] taken into the intake path 23 (intake manifold 12) in one stroke period (for example, the interval of BTDC5degCA) based on the intake air flow rate Qa [g/s], as shown in an equation (1); and applies first-order-lag filter processing, which simulates a delay in the intake manifold 12 (surge tank), to the intake air amount QA, so as to calculate a cylinder intake air amount QAc [g/stroke] taken into the cylinder 25 in one stroke period. The driving condition detection unit 51 calculates the intake air amount QA by multiplying one stroke period ΔT to the intake air flow rate Qa, for example.

$$QAc(n) = KCCA \cdot QAc(n-1) + (1-KCCA) \cdot QA(n)$$

$$QA(n) = Qa(n) \cdot \Delta T(n) \quad (1)$$

Where KCCA is a preliminarily set filter gain. Where (n) denotes the value in the present calculation cycle and (n−1) denotes the value in the immediately previous calculation cycle.

The driving condition detection unit 51 calculates a charging efficiency Ec of intake air by dividing the cylinder intake air amount QAc by a value obtained by multiplying the density ρ0 of air under the standard atmospheric condition to the cylinder volume Vc. The charging efficiency Ec is the ratio of the cylinder intake air amount QAc to the mass (ρ0×Vc) of air under the standard atmospheric condition, with which the cylinder volume Vc is filled. The standard atmospheric condition denotes the state of 1 atm and 25° C.

$$Ec = \frac{QAc}{\rho 0 \cdot Vc} \quad (2)$$

The driving condition detection unit 51 detects a temperature Tex of the exhaust gas at the exhaust path 17 side of the EGR valve 22. In the present embodiment, the driving condition detection unit 51 calculates the temperature Tex of the exhaust gas corresponding to the present rotational speed Ne of the internal combustion engine 1 and the present charging efficiency Ec, by use of an exhaust gas temperature characteristic data in which the relationship among the rotational speed Ne of the internal combustion engine 1, the charging efficiency Ec, and the temperature Tex of the exhaust gas. A temperature sensor may be provided in the exhaust path 17; and based on an output signal of the temperature sensor, the driving condition detection unit 51 may detect the temperature Tex of the exhaust gas. For each characteristic data, a data map, a data table, a polynomial, an equation, or the like is used.

The driving condition detection unit 51 detects a pressure Pex of the exhaust gas at the exhaust path 17 side of the EGR valve 22. In the present embodiment, the driving condition detection unit 51 calculates the pressure Pex of the exhaust gas corresponding to the present rotational speed Ne of the internal combustion engine 1 and the present charging efficiency Ec, by use of an exhaust gas pressure characteristic data in which the relationship among the rotational speed Ne of the internal combustion engine 1, the charging efficiency Ec, and the pressure Pex of exhaust gas.

<Oxygen Concentration Detecting EGR Rate Calculation Unit 52>

Based on the inner-manifold oxygen concentration φo2_in, the oxygen concentration detecting EGR rate calculation unit 52 calculates an oxygen concentration detecting EGR rate Regr, which is a ratio of the exhaust gas recirculated to the intake manifold 12, to the intake air. The detail of the oxygen concentration detecting EGR rate calculation unit 52 will be described later.

<Opening Area Learning Value Calculation Unit 53>

The opening area learning value calculation unit 53 is provided with an oxygen concentration detecting recirculation flow rate calculation unit 56 that calculates an oxygen concentration detecting recirculation flow rate Qeox which is a flow rate of the recirculation exhaust gas based on the oxygen concentration detecting EGR rate Regr and the intake air flow rate Qa. In the present embodiment, the oxygen concentration detecting EGR rate Regr calculated by the oxygen concentration detecting EGR rate calculation unit 52 is an absolute EGR rate which is a ratio of the recirculation exhaust gas to the sum of the intake air and the recirculation exhaust gas, as shown in the equation (11) described later. Then, as shown in an equation (3), the oxygen concentration detecting recirculation flow rate calculation unit 56 converts the absolute EGR rate Regr into a relative EGR rate Regrr which is a ratio of the recirculation exhaust gas to the intake air, and then calculates an oxygen concentration detecting recirculation flow rate Qeox by multiplying the intake air flow rate Qa to the relative EGR rate Regrr.

$$Regrr = \frac{Regr}{1 - Regr} \qquad (3)$$

$$Qeox = Regrr \cdot Qa$$

The opening area learning value calculation unit 53 is provided with an oxygen concentration detecting opening area calculation unit 57 that calculates an oxygen concentration detecting opening area Segrox which is an opening area of the EGR valve 22 which realizes the oxygen concentration detecting recirculation flow rate Qeox, and a learning value calculation unit 58 that calculates a learning value ΔSegrL of the opening area of the EGR valve 22 based on the oxygen concentration detecting opening area Segrox.

In the present embodiment, the oxygen concentration detecting opening area calculation unit 57 calculates a sonic velocity Ae of the exhaust gas at the exhaust path 17 side of the EGR valve 22 based on the temperature Tex of the exhaust gas. The oxygen concentration detecting opening area calculation unit 57 calculates a density ρe of the exhaust gas at the exhaust path 17 side of the EGR valve 22 based on the temperature Tex of the exhaust gas and the pressure Pex of the exhaust gas. Then, the oxygen concentration detecting opening area calculation unit 57 calculates the oxygen concentration detecting opening area Segrox based on the manifold pressure Pb, the pressure Pex of the exhaust gas, the sonic velocity Ae of the exhaust gas, the density ρe of the exhaust gas, and the oxygen concentration detecting recirculation flow rate Qeox.

Specifically, the oxygen concentration detecting opening area calculation unit 57 calculates the oxygen concentration detecting opening area Segrox which realizes the oxygen concentration detecting recirculation flow rate Qeox, by use of an orifice flow rate calculation equation which is a fluid-mechanics theoretical formula for a compressible fluid, in which the flow in the vicinity of the EGR valve 22 is regarded as flows before and after a throttle valve. The theoretical formula for the flow rate Qe [g/s] of the recirculation exhaust gas that flows through the EGR valve 22, regarded as a throttle valve, is derived as represented in the equation (4), from the energy conservation law, the isoentropic flow relational equation, the sonic velocity relational equation, and the state equation.

$$Qe = Ae \cdot \rho e \cdot Segr \cdot \sigma e \qquad (4)$$

$$Ae = \sqrt{\kappa \cdot R \cdot Tex},$$

$$\rho e = \frac{Pex}{R \cdot Tex}$$

$$\sigma e \sqrt{\frac{2}{\kappa - 1} \left[ \left( \frac{Pb}{Pex} \right)^{\frac{2}{\kappa}} - \left( \frac{Pb}{Pex} \right)^{\frac{\kappa+1}{\kappa}} \right]}$$

Where κ is a specific heat ratio of the recirculation exhaust gas, and a preliminarily set value is used. R is a gas constant of the recirculation exhaust gas, and a preliminarily set value is used. Segr is an opening area of the EGR valve 22. σe is a dimensionless flow rate constant that varies in accordance with a pressure ratio Pb/Pex of the upstream and downstream (before and after) of the EGR valve 22.

The oxygen concentration detecting opening area calculation unit 57 calculates a sonic velocity Ae of the exhaust gas based on the temperature Tex of the exhaust gas by use of the second equation of the equation (4). The oxygen concentration detecting opening area calculation unit 57 calculates a density ρe of the exhaust gas based on the temperature Tex of the exhaust gas and the pressure Pex of the exhaust gas by use of the third equation of the equation (4).

The oxygen concentration detecting opening area calculation unit 57 calculates the dimensionless flow rate constant σe corresponding to the present pressure ratio Pb/Pex of the pressure Pex of the exhaust gas and the manifold pressure Pb, by use of a flow rate constant characteristic data in which the relationship between the pressure ratio Pb/Pex of the pressure Pex of the exhaust gas and the manifold pressure Pb, and the dimensionless flow rate constant σe is preliminarily set based on the fourth equation of the equation (4).

Then, as shown in the equation (5) which is obtained by rearranging the first equation of the equation (4) with regard to the opening area Segr, the oxygen concentration detecting opening area calculation unit 57 calculates the oxygen concentration detecting opening area Segrox by dividing the oxygen concentration detecting recirculation flow rate Qeox by the sonic velocity Ae, the density ρe, and the dimensionless flow rate constant σe of the exhaust gas.

$$Segrox = \frac{Qeox}{Ae \cdot \rho e \cdot \sigma e} \quad (5)$$

The learning value calculation unit 58 calculates a base opening area Segrb corresponding to the present opening degree Oe of the EGR valve 22, by use of a base opening characteristic data in which the relationship between the base opening area Segrb of the EGR valve 22 and the opening degree Oe of the EGR valve 22 is preliminarily set. Then, the learning value calculation unit 58 calculates a learning value ΔSegrL of opening area, based on the comparison result between the base opening area Segrb and the oxygen concentration detecting opening area Segrox.

In the present embodiment, as shown in the equation (6), the learning value calculation unit 58 calculates a difference ΔSegrox of opening area between the oxygen concentration detecting opening area Segrox and the base opening area Segrb; calculates a value obtained by applying an averaging processing (in this example, a first-order-lag filtering processing) to the difference ΔSegrox of opening area as the learning value ΔSegrL of opening area; and stores the learning value ΔSegrL to the storage apparatus 91 such as nonvolatile RAM.

$$\Delta Segrox(n)=Segrox(n)-Segrb(n)$$

$$\Delta SegrL(n)=Ks \cdot \Delta SegrL(n-1)+(1-Ks) \cdot \Delta Segrox(n) \quad (6)$$

Where (n) denotes the value in the present calculation cycle, and (n−1) denotes the value in the immediately previous calculation cycle. Ks denotes a filter gain in the first-order lag filtering processing and is preliminarily set to a value corresponding to the time constant. Averaging, such as a moving-averaging processing, may be performed instead of the first order lag filtering processing, for example. A ratio of opening area and the like may be used instead of the difference ΔSegrox of opening area.

The averaging processing can reduce the influence of the response delay of the manifold oxygen concentration sensor 10, the response deviation between the oxygen concentration detecting recirculation flow rate Qeox and the flow rate of the recirculation exhaust gas which passes the EGR valve 22 because the oxygen concentration detecting EGR rate Regr is an EGR rate after mixing in the intake manifold 12, other disturbance factors, and the like; and stability and accuracy of the learning value ΔSegrL of opening area can be improved.

Alternatively, the learning value calculation unit 58 may increase or decrease the learning value ΔSegrL of opening area, based on the comparison result between the oxygen concentration detecting opening area Segrox and the learned opening area SegrL described later. For example, the learning value calculation unit 58 increases the learning value ΔSegrL of opening area, in the case where the oxygen concentration detecting opening area Segrox is larger than the learned opening area SegrL; and the learning value calculation unit 58 decreases the learning value ΔSegrL of opening area, in the case where the oxygen concentration detecting opening area Segrox is smaller than the learned opening area SegrL.

The learning value calculation unit 58 may calculate the learning value ΔSegrL of opening area for each operating point of the opening degree Oe of the EGR valve 22. For example, the learning value calculation unit 58 stores the learning value ΔSegrL of opening area to the storage apparatus 91, such as nonvolatile RAM, for each opening degree section where the opening degree Oe of the EGR valve 22 was preliminarily divided into a plurality of sections; then the learning value calculation unit 58 reads out the learning value ΔSegrL of the opening degree section corresponding to the present opening degree Oe of the EGR valve 22 from the storage apparatus 91, and updates the learning value ΔSegrL by the difference ΔSegrox of opening area. Accordingly, the same number of the learning value ΔSegrL of opening area as the number of the opening degree section is provided.

The learning value calculation unit 58 permits a update of the learning value ΔSegrL of opening area using the equation (6) in the case of determining that a change of the EGR rate is small and in a steady state; and the learning value calculation unit 58 prohibits the update of the learning value ΔSegrL of opening area using the equation (6) and holds the learning value ΔSegrL of opening area in the case of determining that the change of the EGR rate is large and in a transient state. For example, in the case where a period, in which a change amount of the opening degree Oe of the EGR valve 22 is less than or equal to a preliminarily set EGR determination value and a change amount of the opening degree of the throttle valve 6 is less than or equal to a preliminarily set throttle determination value, passes a preliminarily set decision period, the learning value calculation unit 58 determines that the change of the EGR rate is in the steady state; otherwise, the learning value calculation unit 58 determines that the change of the EGR rate is in the transient state.

Such learning permission conditions can reduce the influence of the response delay of the manifold oxygen concentration sensor 10, the response deviation between the oxygen concentration detecting recirculation flow rate Qeox and the flow rate of the recirculation exhaust gas which passes the EGR valve 22 because the oxygen concentration detecting EGR rate Regr is an EGR rate after mixing in the intake manifold 12, and the like; and accuracy of the learning value ΔSegrL of opening area can be improved.

<Recirculation Exhaust Gas Calculation Unit 54 for Control>

The recirculation exhaust gas calculation unit 54 for control is provided with a learned opening area calculation unit 59 that calculates a learned opening area SegrL of the EGR valve 22 corresponding to the present opening degree Oe of the EGR valve 22 using the learning value ΔSegrL of opening area, and a recirculation flow rate calculation unit 60 for control that calculates a flow rate Qes of the recirculation exhaust gas for control, which is used for control of the internal combustion engine 1 based on the learned opening area SegrL.

Since the oxygen concentration detecting recirculation flow rate Qeox, which is delayed in a response due to the response delay of the manifold oxygen concentration sensor 10 and the oxygen concentration detecting EGR rate Regr being an EGR rate after mixing in the intake manifold 12, is not used directly, but the learning value ΔSegrL of opening area calculated based on the oxygen concentration detecting recirculation flow rate Qeox is used, while suppressing that the above-mentioned response delay causes in the flow rate Qes of the recirculation exhaust gas for control, the calculation accuracy of the flow rate Qes of the recirculation exhaust gas for control can be enhanced.

In the present embodiment, the learned opening area calculation unit 59 calculates the learned opening area SegrL by correcting the base opening area Segrb by the learning value ΔSegrL of opening area. Then, the recirculation flow rate calculation unit 60 for control calculates the flow rate Qes of the recirculation exhaust gas for control, based on the learned opening area SegrL, the manifold pressure Pb, the pressure Pex of the exhaust gas, the sonic velocity Ae of the exhaust gas, and the density ρe of the exhaust gas.

The learned opening area calculation unit 59 calculates a value obtained by adding the learning value ΔSegrL of opening area to the base opening area Segrb corresponding to the present opening degree Oe of the EGR valve 22, as the learned opening area SegrL, as shown in the equation (7). As is the case with the learning value calculation unit 58, the learned opening area calculation unit 59 calculates the base opening area Segrb corresponding to the present opening degree Oe of the EGR valve 22 by use of the base opening characteristic data described above. The base opening area Segrb calculated by the learning value calculation unit 58 may be used.

$$SegrL=Segrb+\Delta SegrL \qquad (7)$$

In the case where the opening area learning value calculation unit 53 is configured to calculate the learning value ΔSegrL of opening area for each operating point of the opening degree Oe of the EGR valve 22, the learned opening area calculation unit 59 calculates the flow rate Qes of the recirculation exhaust gas for control using the learning value ΔSegrL of opening area corresponding to the present opening degree Oe of the EGR valve 22. Specifically, the learned opening area calculation unit 59 reads out the learning value ΔSegrL of opening degree section corresponding to the present opening degree Oe of the EGR valve 22 from the storage apparatus 91, and calculates a value obtained by adding the read learning value ΔSegrL to the base opening area Segrb, as the learned opening area SegrL.

The recirculation flow rate calculation unit 60 for control calculates the flow rate Qes of the recirculation exhaust gas for control realized by the learned opening area SegrL by use of the orifice flow rate calculation equation of the equation (4), as is the case with the opening area learning value calculation unit 53. As is the case with the oxygen concentration detecting opening area calculation unit 57, the recirculation flow rate calculation unit 60 for control calculates the sonic velocity Ae of the exhaust gas based on the temperature Tex of the exhaust gas by use of the second equation of the equation (4). As is the case with the oxygen concentration detecting opening area calculation unit 57, the recirculation flow rate calculation unit 60 for control calculates the density ρe of the exhaust gas based on the temperature Tex of the exhaust gas and the pressure Pex of the exhaust gas by use of the third equation of the equation (4). As is the case with the oxygen concentration detecting opening area calculation unit 57, the recirculation flow rate calculation unit 60 for control calculates the dimensionless flow rate constant σe corresponding to the present pressure ratio Pb/Pex of the pressure Pex of the exhaust gas and the manifold pressure Pb, by use of the flow rate constant characteristic data described above. The sonic velocity Ae of the exhaust gas, the density ρe of the exhaust gas, and the dimensionless flow rate constant σe calculated by the oxygen concentration detecting opening area calculation unit 57 may be used.

Then, the recirculation flow rate calculation unit 60 for control calculates a value obtained by multiplying the sonic velocity Ae, the density ρe, and the dimensionless flow rate constant σe of the exhaust gas to the learned opening area SegrL, as the flow rate Qes of the recirculation exhaust gas for control, by use of the equation (8) corresponding to the first equation of the equation (4).

$$Qes=Ae \cdot \rho e \cdot SegrL \cdot \sigma e \qquad (8)$$

The recirculation exhaust gas calculation unit 54 for control is provided with an EGR rate calculation unit 61 for control that calculates an EGR rate Regrs for control based on the flow rate Qes of the recirculation exhaust gas for control. The EGR rate calculation unit 61 for control calculates a recirculation exhaust gas amount QES [g/stroke] which recirculates to the intake manifold 12 in one stroke period (for example, the interval of BTDC5degCA) based on the flow rate Qes [g/s] of the recirculation exhaust gas for control, as shown in the equation (9); and applies first-order-lag filter processing, which simulates a delay in the intake manifold 12 (surge tank), to the recirculation exhaust gas amount QES, so as to calculate a cylinder intake recirculation exhaust gas amount QESc [g/stroke] which is an amount of the recirculation exhaust gas taken into the cylinder 25 in one stroke period. The EGR rate calculation unit 61 for control calculates the recirculation exhaust gas amount QES by multiplying one stroke period ΔT to the flow rate Qes [g/s] of the recirculation exhaust gas for control, for example.

$$QESc(n)=KCCA \cdot QESc(n-1)+(1-KCCA) \cdot QES(n)$$

$$QES(n)=Qes(n) \cdot \Delta T(n) \qquad (9)$$

Where KCCA is the preliminarily set filter gain, and the same value as one of the equation (1) can be used.

The EGR rate calculation unit 61 for control calculates the EGR rate Regrs for control based on the cylinder intake air amount QAc and the cylinder intake recirculation exhaust gas amount QESc. In the present embodiment, the EGR rate calculation unit 61 for control calculates a relative EGR rate obtained by dividing the cylinder intake recirculation exhaust gas amount QESc by the cylinder intake air amount QAc, as the EGR rate Regrs for control, as shown in the equation (10). An absolute EGR rate may be calculated.

$$Regrs = \frac{QESc}{QAc} \qquad (10)$$

<Recirculation Amount Utilization Control Unit 55>

The recirculation amount utilization control unit 55 controls the internal combustion engine 1 using the recirculation exhaust gas flow rate Qes for control which is calculated by the recirculation exhaust gas calculation unit 54 for control. In the present embodiment, the recirculation amount utilization control unit 55 performs at least one or more of a change of the ignition timing, a change of the opening degree Oe of the EGR valve 22, and a calculation of an output torque of the internal combustion engine 1, based on the flow rate Qes of the recirculation exhaust gas for control.

For example, the recirculation amount utilization control units 55 calculates the ignition timing, based on the rotation speed Ne of the internal combustion engine 1, the charging efficiency Ec, and the EGR rate Regrs for control. The recirculation amount utilization control unit 55 calculates a target EGR rate based on driving condition such as the rotational speed Ne of the internal combustion engine 1 and the charging efficiency Ec, and increases or decreases the opening degree Oe of the EGR valve 22 so that the EGR rate Regrs for control approaches the target EGR rate. By improving the calculation accuracy of the recirculation exhaust gas flow rate Qes for control, the setting precision of the ignition timing and the control accuracy of the EGR rate can be improved, and the control accuracy of the combustion condition, the output torque, the thermal efficiency, the NOx generation amount, and the like of the internal combustion engine 1 can be improved.

The recirculation amount utilization control units 55 calculates the thermal efficiency based on the rotation speed Ne of the internal combustion engine 1, the charging efficiency Ec, and the EGR rate Regrs for control. Then, the recirculation amount utilization control unit 55 calculates an indicated mean effective pressure by multiplying the thermal efficiency to the calorific value of the fuel supplied to the cylinder 25, and calculates the output torque of the internal combustion engine 1 based on the indicated mean effective pressure. The recirculation amount utilization control unit 55 changes the ignition timing, the intake air amount, and the recirculation exhaust gas amount based on the output torque of the internal combustion engine 1; or transmits the output torque of the internal combustion engine 1 to other controllers such as the transmission controller 81 and makes other controllers use the output torque for a torque control of the whole vehicle.

1-2-1. Detailed Explanation of Oxygen Concentration Detecting EGR
Rate Calculation Unit 52

Next, the oxygen concentration detecting EGR rate calculation unit 52 will be explained in detail. In the present embodiment, the oxygen concentration detecting EGR rate Regr is the absolute EGR rate, and is the ratio of the exhaust gas recirculated into the intake manifold 12 (the recirculation exhaust gas) to the gas in the intake manifold 12. In the following description, the oxygen concentration detecting EGR rate Regr also be referred to simply as the EGR rate Regr. The EGR rate Regr can be calculated by a ratio of a partial pressure P_egr of the recirculation exhaust gas recirculated into the intake manifold 12 to the manifold pressure Pb which is the pressure of gas in the intake manifold 12, as shown in the equation (11).

$$Regr = \frac{P\_egr}{Pb} \tag{11}$$

Figure 4:
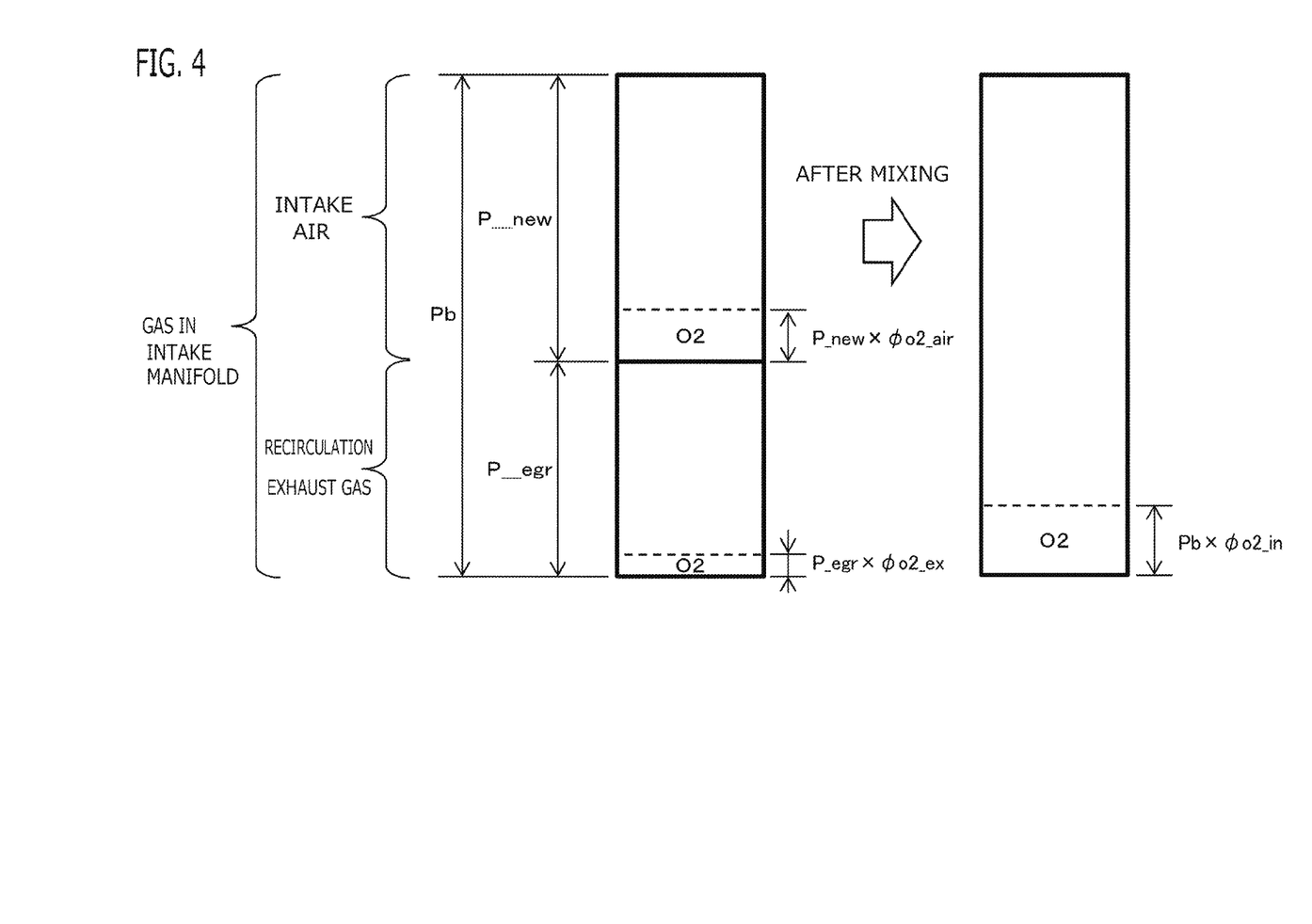
FIG. 4 is a figure showing the state of partial pressures of gasses in the intake manifold according to Embodiment 1 of the present invention.

FIG. 4 represents the state of partial pressures of gasses in the intake manifold 12 at a time when exhaust gas is recirculated into the intake manifold 12. The gas in the intake manifold 12 is a mixture gas of the intake air taken into the intake manifold 12 from the atmosphere, and the recirculation exhaust gas recirculated into the intake manifold 12. Here, the partial pressure of the intake air taken into the intake manifold 12 is expressed by "P_new".

As shown in the equation (12), the oxygen partial pressure Pb_o2 of the gas in the intake manifold 12 can be calculated, indirectly, by summing up the oxygen partial pressure (P_new·φo2_air) of the intake air taken into the intake manifold 12, and the oxygen partial pressure (P_egr·φo2_ex) of the recirculation exhaust gas recirculated into the intake manifold 12, and can be calculated, directly, by multiplying the inner-manifold oxygen concentration φo2_in [vol %] to the manifold pressure Pb. Here, the oxygen partial pressure of the intake air in the intake manifold 12 can be calculated by multiplying the atmospheric oxygen concentration φo2_air [vol %] to the partial pressure P_new of the intake air in the manifold pressure. The oxygen partial pressure of the recirculation exhaust gas in the intake manifold 12 can be calculated by multiplying the oxygen concentration φo2_ex [vol %] of the exhaust gas to the partial pressure P_egr of the recirculation exhaust gas in the manifold pressure. Each oxygen concentration is volume concentration.

$$Pb\_o2 = P\_new \cdot \phi o2\_air + P\_egr \cdot \phi o2\_ex = Pb \cdot \phi o2\_in \tag{12}$$

By rearranging after dividing the equation (12) by Pb·φo2_in, the equation (13) for calculating the EGR rate Regr is derived. The equation (13) shows that the EGR rate Regr can be calculated based on the inner-manifold oxygen concentration φo2_in [vol %].

$$\frac{P\_new}{Pb} \cdot \frac{\phi o2\_air}{\phi o2\_in} + \frac{P\_egr}{Pb} \cdot \frac{\phi o2\_ex}{\phi o2\_in} = 1 \tag{13}$$

$$\left(1 - \frac{P\_egr}{Pb}\right) \cdot \frac{\phi o2\_air}{\phi o2\_in} + \frac{P\_egr}{Pb} \cdot \frac{\phi o2\_ex}{\phi o2\_in} = 1$$

$$Regr = \frac{P\_egr}{Pb} = \frac{\phi o2\_air - \phi o2\_in}{\phi o2\_air - \phi o2\_ex}$$

Accordingly, the oxygen concentration detecting EGR rate calculation unit 52 calculates the oxygen concentration detecting EGR rate Regr based on the inner-manifold oxygen concentration φo2_in [vol %].

According to the configuration, since the EGR rate (the oxygen concentration detecting EGR rate) is calculated based on the detection value of the inner-manifold oxygen concentration φo2_in which is hardly influenced by the individual difference and the aging change of the internal combustion engine 1 main body, the detection accuracy of the EGR rate can be improved. On the other hand, since the inner-manifold oxygen concentration φo2_in is the oxygen concentration of gas after mixing and averaging the intake air and the recirculation exhaust gas in the intake manifold 12, the oxygen concentration detecting EGR rate Regr is an information which was delayed in response rather than the flow rate of recirculation exhaust gas which passes the EGR valve 22. Therefore, it is not easy to calculate the accurate flow rate of recirculation exhaust gas having no response delay directly from the oxygen concentration detecting EGR rate Regr. Accordingly, as mentioned above, by calculating the learning value ΔSegrL of the opening area of the EGR valve 22 in which a responsiveness is not required, based on the oxygen concentration detecting EGR rate Regr and the like, and calculating the flow rate Qes of the recirculation exhaust gas for control, based on the learned opening area SegrL, the flow rate of the recirculation exhaust gas after learning having no response delay can be calculated. Therefore, the influence of the individual difference and the aging change of the flow characteristic of EGR valve 22 is learned by the method which is hardly influenced by the individual difference and the aging change of the internal combustion engine body, and the estimation accuracy of the flow rate Qes of the recirculation exhaust gas for control can be improved.

In the present embodiment, using the calculation equation of the equation (14), the oxygen concentration detecting EGR rate calculation unit 52 calculates the oxygen concentration detecting EGR rate Regr based on the detected inner-manifold oxygen concentration φo2_in [vol %]. Here, the atmospheric oxygen concentration φo2_air [vol %] is preliminarily set to 21 [vol %] as a standard value.

$$Regr = \frac{\phi o2\_air - \phi o2\_in}{\phi o2\_air - \phi o2\_ex} \tag{14}$$

Since the oxygen concentration φo2_ex [vol %] of the exhaust gas becomes low significantly rather than the atmospheric air by combustion, it may be set to 0 or a preliminarily set fixed value around 0. Even in this case, in the denominator of the equation (14), since the oxygen concentration φo2_ex [vol %] of the exhaust gas becomes small to 21 of the atmospheric oxygen concentration φo2_air, it is suppressed that the calculation accuracy of the oxygen concentration detecting EGR rate Regr is significantly deteriorated.

The oxygen concentration detecting EGR rate calculation unit 52 may calculate the oxygen concentration detecting EGR rate Regr corresponding to the present inner-manifold oxygen concentration φo2_in [vol %], by use of an EGR rate characteristic data in which the relationship between the inner-manifold oxygen concentration φo2_in [vol %] and the oxygen concentration detecting EGR rate Regr is preliminarily set. The EGR rate characteristic data may be preliminarily set based on the equation (14), or maybe preliminarily set based on an experimental value.

<Calculation of Oxygen Concentration of Exhaust Gas Based on Air-Fuel Ratio>

The oxygen concentration φo2_ex [vol %] of the exhaust gas changes in accordance with the air-fuel ratio AF of the internal combustion engine 1. In order to improve the calculation accuracy of the oxygen concentration detecting EGR rate Regr, it is desirable to change the oxygen concentration φo2_ex [vol %] of the exhaust gas in accordance with the air-fuel ratio AF of the internal combustion engine 1.

In the present embodiment, the oxygen concentration detecting EGR rate calculation unit 52 calculates the oxygen concentration φo2_ex [vol %] of the exhaust gas based on the air-fuel ratio AF of the internal combustion engine 1, and calculates the oxygen concentration detecting EGR rate Regr based on the inner-manifold oxygen concentration φo2_in [vol %] and the oxygen concentration φo2_ex [vol %] of the exhaust gas.

According to this configuration, the oxygen concentration φo2_ex [vol %] of the exhaust gas can be changed in accordance with the air-fuel ratio AF, and the calculation accuracy of the oxygen concentration detecting EGR rate Regr can be improved.

In the present embodiment, the oxygen concentration detecting EGR rate calculation unit 52 calculates the oxygen concentration φo2_ex [vol %] of the exhaust gas based on the air-fuel ratio AF detected by the air-fuel ratio sensor 18. Alternatively, the oxygen concentration detecting EGR rate calculation unit 52 may use the air-fuel ratio AF calculated based on the fuel correction coefficient used for calculating the fuel injection amount. For example, the fuel correction coefficient is a correction coefficient multiplied to a basic fuel injection amount calculated so as to become the theoretical air-fuel ratio; and a value obtained by dividing the theoretical air-fuel ratio (for example, 14.7) by the fuel correction coefficient is calculated as the air-fuel ratio AF.

The oxygen concentration detecting EGR rate calculation unit 52 calculates the oxygen concentration detecting EGR rate Regr based on the inner-manifold oxygen concentration φo2_in [vol %] and the oxygen concentration φo2_ex [vol %] of the exhaust gas, by use of the calculation equation of the equation (14). Alternatively, by use of an EGR rate characteristic data in which the relationship among the inner-manifold oxygen concentration φo2_in [vol %], the oxygen concentration φo2_ex [vol %] of the exhaust gas, and the oxygen concentration detecting EGR rate Regr is preliminarily set, the oxygen concentration detecting EGR rate calculation unit 52 may calculate the oxygen concentration detecting EGR rate Regr corresponding to the present inner-manifold oxygen concentration φo2_in [vol %] and the present oxygen concentration φo2_ex [vol %] of the exhaust gas. The EGR rate characteristic data may be preliminarily set based on the equation (14), or may be preliminarily set based on an experimental value.

<Oxygen Concentration of Exhaust Gas>

Hereinafter, by paying attention to the respective numbers of moles of molecules and the partial pressures of gases in a combustion chemical reaction formula, a relational equation among the respective numbers of moles of molecules, the partial pressures, the oxygen concentration, and the EGR rate Regr will be derived. The combustion chemical reaction formula for a hydrocarbon at a time when the fuel of the internal combustion engine 1 is gasoline, for example, is expressed by the equation (15).

$$C_nH_m + \left(n + \frac{m}{4}\right) \cdot O_2 \rightarrow n \cdot CO_2 + \frac{m}{2} \cdot H_2O \qquad (15)$$

It is assumed that the average molecular formula for gasoline is C7H14 and that the composition of air is "oxygen (O2):nitrogen (N2)=21:79". In the case where the gasoline and the air combust together at the theoretical air-fuel ratio AF0, the combustion chemical reaction formula is expressed by the equation (16).

λ=1

$$2 \cdot C_7H_{14} + 21 \cdot O_2 + 79 \cdot N_2 \rightarrow 14 \cdot CO_2 + 14 \cdot H_2O + 79 \cdot N_2 \qquad (16)$$

Under the conditions that air-fuel ratio AF is rich (λ<1), in the case where all the oxygen was consumed and gasoline burned, the combustion chemical reaction formula is expressed by the equation (17).

λ<1

$$2 \cdot C_7H_{14} + \lambda \cdot (21 \cdot O_2 79 \cdot N_2) \rightarrow \lambda \cdot (14 \cdot CO_2 + 14 \cdot H_2O + 79 \cdot N_2) + (1-\lambda) \cdot 2 \cdot C_7H_{14} \qquad (17)$$

Under the conditions that air-fuel ratio ΔF is lean (λ>1), in the case where all the gasoline burned, the combustion chemical reaction formula is expressed by the equation (18).

λ>1

$$2 \cdot C_7H_{14} + \lambda \cdot (21 \cdot O_2 + 79 \cdot N_2) \rightarrow 14 \cdot CO_2 + 14 \cdot H_2O + \lambda \cdot 79 \cdot N_2 + (\lambda-1) \cdot 21 \cdot O_2 \qquad (18)$$

Each of the equations (16), (17), (18) is a pure combustion chemical reaction formula in which no recirculation exhaust gas is taken into consideration. An excess air ratio λ is the ratio of the air-fuel ratio AF to the theoretical air-fuel ratio AF0 (for example, 14.7), as represented in the equation (19). When λ=1, the air-fuel ratio AF is equal to the theoretical air-fuel ratio AF0; when λ<1, the air-fuel ratio AF is rich; when λ>1, the air-fuel ratio AF is lean.

$$\lambda = \frac{AF}{AF0} \qquad (19)$$

Figure 5:
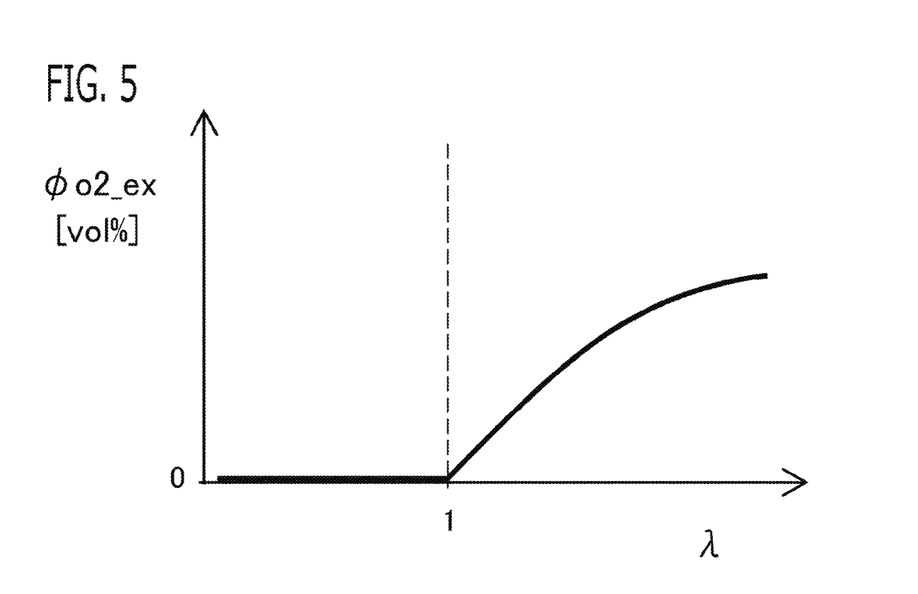
FIG. 5 is a figure showing an example of the exhaust air oxygen concentration characteristic data according to Embodiment 1 of the present invention.

As shown in the equation (20) and FIG. 5, in the case of the theoretical air-fuel ratio (λ=1) and rich (λ<1), there is no O2 on the right side of the equation (16) and the equation (17), and zero can be set to the oxygen concentration φo2_ex [vol %] of the exhaust gas. In the case of lean (λ>1), the ratio of the mol number of O2 to the total mol number of each gas molecules on the right side of the equation (18) can be set to the oxygen concentration φo2_ex [vol %] of the exhaust gas.

$$\begin{aligned} &1)\ \lambda = 1, \lambda < 1\ \phi o2\_ex = 0 \\ &2)\ \lambda > 1\ \phi o2\_ex = \\ &\qquad \frac{(\lambda-1)\cdot 21}{14+14+\lambda\cdot 79+(\lambda-1)\cdot 21}\cdot 100 = \frac{21\cdot(\lambda-1)}{100\cdot\lambda+7}\cdot 100 \end{aligned} \quad (20)$$

As shown in the example of FIG. 5, in the case where the air-fuel ratio AF is the theoretical air-fuel ratio ($\lambda$=1) or rich ($\lambda$<1), the oxygen concentration detecting EGR rate calculation unit 52 sets the oxygen concentration φo2_ex [vol %] of the exhaust gas to zero; and in the case where the air-fuel ratio AF is lean ($\lambda$>1), the oxygen concentration detecting EGR rate calculation unit 52 makes the oxygen concentration φo2_ex [vol %] of the exhaust gas increase from zero, as the lean degree of the air-fuel ratio AF increases.

According to this configuration, the oxygen concentration φo2_ex [vol %] of the exhaust gas can accurately be calculated, in accordance with whether the air-fuel ratio AF is the theoretical air-fuel ratio, rich, or lean. In the present embodiment, since the exhaust gas recirculates from the exhaust path 17 at the downstream side of the catalyst 19, even in the case where the unburnt fuel is included in the exhaust gas discharged from the cylinder 25, the unburnt fuel is oxidized in the catalyst 19 (combustion), and in case of the theoretical air-fuel ratio and rich, the oxygen concentration of the exhaust gas becomes close to zero. Therefore, as the above-mentioned configuration, even if the oxygen concentration φo2_ex [vol %] of the exhaust gas is set to zero, the calculation accuracy of oxygen concentration detecting EGR rate Regr can be maintained.

In the present embodiment, in the case of the air-fuel ratio AF is lean ($\lambda$>1), the oxygen concentration detecting EGR rate calculation unit 52 calculates the oxygen concentration φo2_ex [vol %] of the exhaust gas, by use of the second equation of the equation (20). According to this configuration, by the equation derived from the mol number ratio in the chemical reaction formula of the equation (18) in the case of lean, the oxygen concentration detecting EGR rate Regr in the case of lean can accurately be calculated.

Alternatively, by use of an exhaust gas oxygen concentration characteristic data in which the relationship between the air-fuel ratio AF and the oxygen concentration φo2_ex [vol %] of the exhaust gas is preliminarily set, the oxygen concentration detecting EGR rate calculation unit 52 may set the oxygen concentration φo2_ex [vol %] of the exhaust gas corresponding to the present air-fuel ratio AF. The exhaust gas oxygen concentration characteristic data may be preliminarily set based on the equation (20), or maybe preliminarily set based on the experimental value.

Since the unburnt fuel is not oxidized by the catalyst 19 in the case where the exhaust gas recirculates from the exhaust path 17 at the upstream side of the catalyst 19, even in the case of the theoretical air-fuel ratio and rich, the oxygen concentration φo2_ex [vol %] of the exhaust gas becomes higher than zero, and in the case of lean, the oxygen concentration φo2_ex [vol %] of the exhaust gas becomes higher than the second equation of the equation (20).

Figure 6:
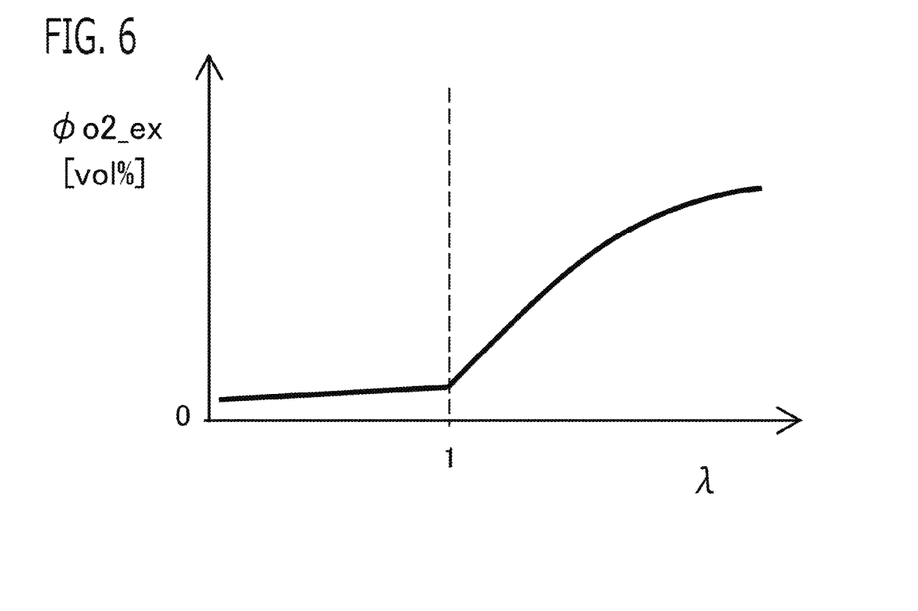
FIG. 6 is a figure showing the example of the exhaust air oxygen concentration characteristic data according to Embodiment 1 of the present invention.

Then, as shown in the example of FIG. 6, in the case where the air-fuel ratio AF is the theoretical air-fuel ratio ($\lambda$=1) or rich ($\lambda$<1), the oxygen concentration detecting EGR rate calculation unit 52 may set the oxygen concentration φo2_ex [vol %] of the exhaust gas to a larger value than zero; and in the case where the air-fuel ratio AF is lean ($\lambda$>1), the oxygen concentration detecting EGR rate calculation unit 52 may make the oxygen concentration φo2_ex [vol %] of the exhaust gas increase, as the lean degree of the air-fuel ratio AF increases. In this case, by use of a preliminarily set exhaust air oxygen concentration characteristic data as shown in the example of FIG. 6, the oxygen concentration detecting EGR rate calculation unit 52 sets the oxygen concentration φo2_ex [vol %] of the exhaust gas corresponding to the present air-fuel ratio AF. The exhaust air oxygen concentration characteristic data is preliminarily set based on the experimental value.

The oxygen concentration of the exhaust gas changes in accordance with the driving condition such as the rotational speed Ne of the internal combustion engine 1, the charging efficiency Ec, and the EGR rate. Therefore, by use of an exhaust air oxygen concentration characteristic data which is preliminarily set for each driving condition, the oxygen concentration detecting EGR rate calculation unit 52 may set the oxygen concentration φo2_ex [vol %] of the exhaust gas corresponding to the present driving condition and the air-fuel ratio AF.

1-2-2. Flowchart

Figure 7:
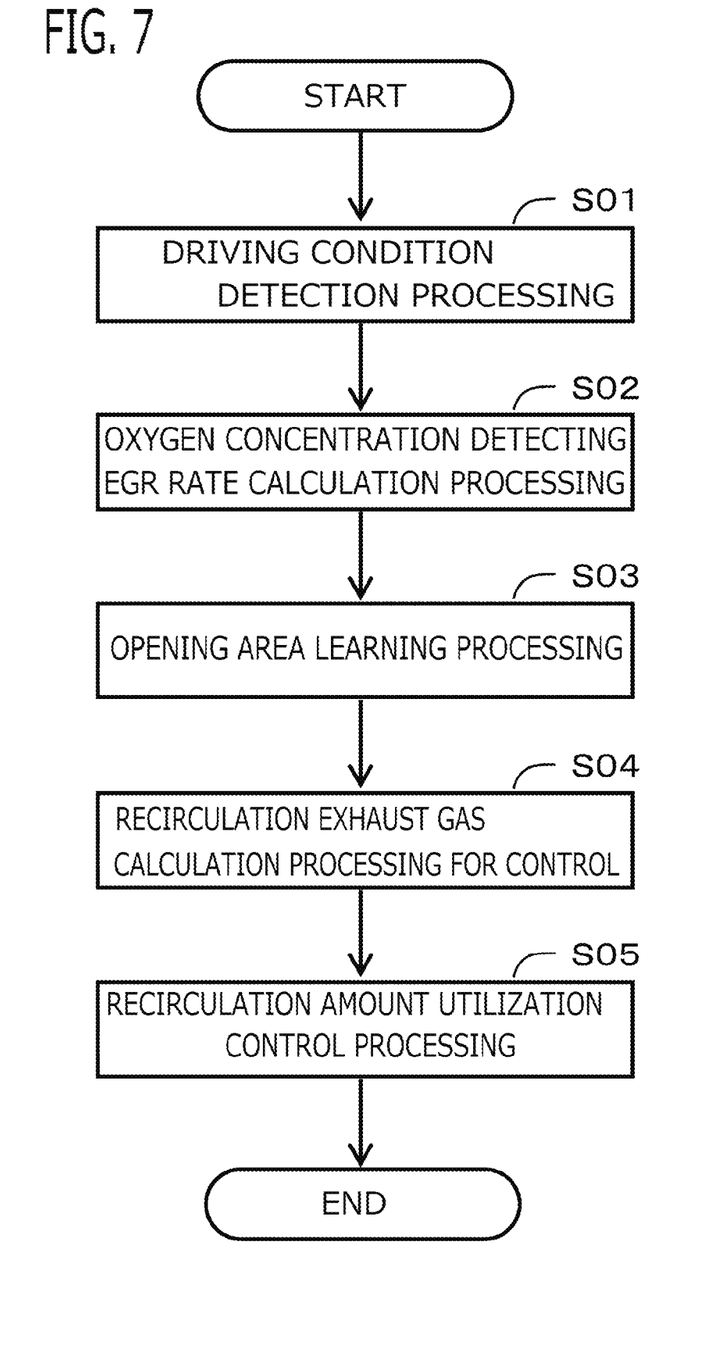
FIG. 7 is a flow chart showing the processing by the controller according to Embodiment 1 of the present invention.

The procedure (the control method for the internal combustion engine 1) of the processing by the controller 50 according to Embodiment 1 will be explained based on the flowchart represented in FIG. 7. The processing represented in the flowchart in FIG. 7 is recurrently implemented, for example, every constant operation cycle while the computing processing unit 90 implements software (a program) stored in the storage apparatus 91.

In the step S01, as mentioned above, the driving condition detection unit 51 implements a driving condition detection processing (a driving condition detection step) that detects the various kinds of driving conditions of the internal combustion engines 1, such as the inner-manifold oxygen concentration φo2_in, the intake air flow rate Qa, and the opening degree Oe of EGR valve 22.

Next, in the step S02, as mentioned above, the oxygen concentration detecting EGR rate calculation unit 52 implements an oxygen concentration detecting EGR rate calculation processing (an oxygen concentration detecting EGR rate calculation step) that calculates the oxygen concentration detecting EGR rate Regr, based on the inner-manifold oxygen concentration φo2_in. In the present embodiment, as mentioned above, the oxygen concentration detecting EGR rate calculation unit 52 calculates the oxygen concentration φo2_ex [vol %] of the exhaust gas based on the air-fuel ratio AF of the internal combustion engine 1, and calculates the oxygen concentration detecting EGR rate Regr based on the inner-manifold oxygen concentration φo2_in [vol %] and the oxygen concentration φo2_ex [vol %] of the exhaust gas.

In the step S03, as mentioned above, the opening area learning value calculation unit 53 implements an opening area learning value calculation processing (an opening area learning value calculation step) that calculates the oxygen concentration detecting recirculation flow rate Qeox based on oxygen concentration detecting EGR rate Regr and the intake air flow rate Qa, calculates the oxygen concentration detecting opening area Segrox which is the opening area of the EGR valve 22 which realizes the oxygen concentration detecting recirculation flow rate Qeox, and calculates the learning value ΔSegrL of the opening area of the EGR valve 22 based on the oxygen concentration detecting opening area Segrox.

In the step S04, as mentioned above, the recirculation exhaust gas calculation unit 54 for control implements a recirculation exhaust gas calculation processing for control (a recirculation exhaust gas calculation step for control) that calculates the learned opening area SegrL of the EGR valve 22 corresponding to the present opening degree Oe of the EGR valve 22 using the learning value ΔSegrL of the opening area, and calculates the flow rate Qes of the recirculation exhaust gas for control used for control of the internal combustion engine 1 based on the learned opening area SegrL.

In the step S05, as mentioned above, the recirculation amount utilization control unit 55 implements a recirculation amount utilization control processing (a recirculation amount utilization control step) that controls the internal combustion engine 1 using the recirculation exhaust gas flow rate Qes for control.

OTHER EMBODIMENTS

Lastly, other embodiments of the present invention will be explained. Each of the configurations of embodiments to be explained below is not limited to be separately utilized but can be utilized in combination with the configurations of other embodiments as long as no discrepancy occurs.

(1) In the above-mentioned Embodiment 1, there has been explained the case in which considering the case where as the fuel for the internal combustion engine 1, gasoline is utilized, it is assumed that the average molecular formula of gasoline and the composition of air are given by the equations (16) to (18). However, embodiments of the present invention are not limited to the foregoing case. That is to say, the chemical reaction formula and the mol number of each molecules in the chemical reaction formula may be changed by using a stricter value for the average molecular formula of gasoline and the air composition, and the setting values of each constant of the second equation of the equation (20) used for calculation of the oxygen concentration $\varphi o2\_ex$ [vol %] of the exhaust gas may be changed. As fuel of the internal combustion engine 1, fuel other than gasoline, for example, light oil, alcohol, or natural gas may be used, the average molecular formula of fuel may be changed in accordance with the kind of fuel, and the chemical reaction formula and the mol number of each molecules of the chemical reaction formula may be changed, and the setting values of each constant of the second equation of the equation (20) used for calculation of the oxygen concentration $\varphi o2\_ex$ [vol %] of the exhaust gas may be changed.

(2) In the above-mentioned Embodiment 1, there has been explained the case where the internal combustion engine 1 is a natural aspiration engine. However, the internal combustion engine 1 may be an internal combustion engine equipped with a turbocharger or a supercharger.

(3) In the above-mentioned Embodiment 1, there has been explained the case in which the recirculation amount utilization control unit 55 performs, as mentioned above, at least one or more of a change of the ignition timing, a change of the opening degree Oe of the EGR valve 22, and a calculation of an output torque of the internal combustion engine 1, based on the flow rate Qes of the recirculation exhaust gas for control. However, embodiments of the present invention are not limited to the foregoing case. That is to say, the recirculation amount utilization control unit 55 may use the recirculation exhaust gas flow rate Qes for control of other than these controls, for example, a control of the intake air amount, a control for changing the valve opening and closing timing of one or both of the intake valve 14 and the exhaust valve 15, and the like.

Various modifications and alterations of this invention will be apparent to those skilled in the art without departing from the scope and spirit of this invention, and it should be understood that this is not limited to the illustrative embodiments set forth herein.

What is claimed is:

1. A controller for an internal combustion engine that is provided with an intake path and an exhaust path, a throttle valve for opening and closing the intake path, an EGR path for recirculating exhaust gas from the exhaust path to an intake manifold which is a part of the intake path at the downstream side of the throttle valve, and an EGR valve for opening and closing the EGR path, the controller for the internal combustion engine comprising:

a driving condition detector that detects an inner-manifold oxygen concentration which is an oxygen concentration of gas in the intake manifold, an intake air flow rate which is a flow rate of intake air taken into in the intake path, and an opening degree of the EGR valve;

an oxygen concentration detecting EGR rate calculator that calculates an oxygen concentration detecting EGR rate, which is a ratio of a recirculation exhaust gas which is the exhaust gas recirculated into the intake manifold, to the intake air, based on the inner-manifold oxygen concentration;

an opening area learning value calculator that calculates an oxygen concentration detecting recirculation flow rate which is a flow rate of the recirculation exhaust gas based on the oxygen concentration detecting EGR rate and the intake air flow rate, calculates an oxygen concentration detecting opening area which is an opening area of the EGR valve which realizes the oxygen concentration detecting recirculation flow rate, and calculates a learning value of the opening area of the EGR valve based on the oxygen concentration detecting opening area; and a recirculation exhaust gas calculator for control that calculates a learned opening area of the EGR valve corresponding to the present opening degree of the EGR valve using the learning value of the opening area, and calculates a flow rate of the recirculation exhaust gas for control used for controlling the internal combustion engine based on the learned opening area.

2. The controller for the internal combustion engine according to claim 1, wherein the oxygen concentration detecting EGR rate calculator calculates the oxygen concentration of the exhaust gas based on an air-fuel ratio of the internal combustion engine, and calculates the oxygen concentration detecting EGR rate based on the inner-manifold oxygen concentration and the oxygen concentration of the exhaust gas.

3. The controller for the internal combustion engine according to claim 2, wherein in the case where the air-fuel ratio is a theoretical air-fuel ratio or rich, the oxygen concentration detecting EGR rate calculator sets the oxygen concentration of the exhaust gas to zero; and in the case where the air-fuel ratio is lean, as a lean degree of the air-fuel ratio increases, the oxygen concentration detecting EGR rate calculator makes the oxygen concentration of the exhaust gas increase from zero.

4. The controller for the internal combustion engine according to claim 2, wherein in the case where the air-fuel ratio is a theoretical air-fuel ratio or rich, the oxygen concentration detecting EGR rate calculator sets the oxygen concentration of the exhaust gas to zero; and in the case where the air-fuel ratio is lean, by setting the oxygen concentration of the exhaust gas to O2_ex, and setting an excess air ratio obtained by dividing the air-fuel ratio by the theoretical air-fuel ratio to λ, the oxygen concentration detecting EGR rate calculator calculates the oxygen concentration of the exhaust gas by a calculation equation of O2_ex=21×(λ−1)/(100×λ+7).

5. The controller for the internal combustion engine according to claim 2, wherein by setting the oxygen concentration detecting EGR rate to Regr, setting the inner-manifold oxygen concentration to O2_in, setting the oxygen concentration of the exhaust gas to O2_ex, and setting an oxygen concentration of the intake air, which is set to a preliminarily set standard value, to O2_air, the oxygen concentration detecting EGR rate calculator calculates the oxygen concentration detecting EGR rate by a calculation equation of Regr=(O2_air−O2_in)/(O2_air−O2_ex).

6. The controller for the internal combustion engine according to claim 1, wherein the driving condition detector detects a temperature of the exhaust gas at the exhaust path side of the EGR valve, and a pressure of the exhaust gas at the exhaust path side of the EGR valve, and wherein the opening area learning value calculator calculates a sonic velocity of the exhaust gas at the exhaust path side of the EGR valve based on the temperature of the exhaust gas, calculates a density of the exhaust gas at the exhaust path side of the EGR valve based on the temperature of the exhaust gas and the pressure of the exhaust gas, and calculates the oxygen concentration detecting opening area based on the manifold pressure, the pressure of the exhaust gas, the sonic velocity of the exhaust gas, the density of the exhaust gas, and the oxygen concentration detecting recirculation flow rate.

7. The controller for the internal combustion engine according to claim 6, wherein the opening area learning value calculator calculates a base opening area corresponding to the present opening degree of the EGR valve, by use of a base opening characteristic data in which the relationship between the base opening area of the EGR valve and the opening degree of the EGR valve is preliminarily set, and calculates the learning value of the opening area based on the comparison result between the base opening area and the oxygen concentration detecting opening area, and wherein the recirculation exhaust gas calculator for control calculates the learned opening area by correcting the base opening area with the learning value of the opening area, and calculates the flow rate of the recirculation exhaust gas for control based on the learned opening area, the manifold pressure, the pressure of the exhaust gas, the sonic velocity of the exhaust gas, and the density of the exhaust gas.

8. The controller for the internal combustion engine according to claim 1, wherein the opening area learning value calculator calculates the learning value of the opening area for each operating point of the opening degree of the EGR valve, and wherein the recirculation exhaust gas calculator for control calculates the flow rate of the recirculation exhaust gas for control using the learning value of the opening area corresponding to the present opening degree of the EGR valve.

9. The controller for the internal combustion engine according to claim 1, wherein the opening area learning value calculator permits a update of the learning value of the opening area in the case of determining that a change of the EGR rate is small and in a steady state, and prohibits the update of the learning value of the opening area and holds the learning value of the opening area in the case of determining that the change of the EGR rate is large and in a transient state.

10. The controller for the internal combustion engine according to claim 1, further comprising a recirculation amount utilization controller that performs at least one or more of a change of an ignition timing, a change of the opening degree of the EGR valve, and a calculation of an output torque of the internal combustion engine, based on the flow rate of the recirculation exhaust gas for control.

11. A control method for an internal combustion engine that is provided with an intake path and an exhaust path, a throttle valve for opening and closing the intake path, an EGR path for recirculating exhaust gas from the exhaust path to an intake manifold which is a part of the intake path at the downstream side of the throttle valve, and an EGR valve for opening and closing the EGR path, the control method comprising:

a driving condition detecting that detects an inner-manifold oxygen concentration which is an oxygen concentration of gas in the intake manifold, an intake air flow rate which is a flow rate of intake air taken into in the intake path, and an opening degree of the EGR valve;

an oxygen concentration detecting EGR rate calculating that calculates an oxygen concentration detecting EGR rate, which is a ratio of a recirculation exhaust gas which is the exhaust gas recirculated into the intake manifold, to the intake air, based on the inner-manifold oxygen concentration;

an opening area learning value calculating that calculates an oxygen concentration detecting recirculation flow rate which is a flow rate of the recirculation exhaust gas based on the oxygen concentration detecting EGR rate and the intake air flow rate, calculates an oxygen concentration detecting opening area which is an opening area of the EGR valve which realizes the oxygen concentration detecting recirculation flow rate, and calculates a learning value of the opening area of the EGR valve based on the oxygen concentration detecting opening area; and a recirculation exhaust gas calculating for control that calculates a learned opening area of the EGR valve corresponding to the present opening degree of the EGR valve using the learning value of the opening area, and calculates a flow rate of the recirculation exhaust gas for control used for controlling the internal combustion engine based on the learned opening area.

* * * * *